(12) United States Patent
Allen et al.

(10) Patent No.: US 8,143,759 B2
(45) Date of Patent: Mar. 27, 2012

(54) LAMINATED STATOR ASSEMBLY

(75) Inventors: Edward C. Allen, Davis, IL (US); Andrew P. Grosskopf, Rockford, IL (US); Brady A. Manogue, Beloit, WI (US); Eric A. Brust, Machesney Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 289 days.

(21) Appl. No.: 12/432,943

(22) Filed: Apr. 30, 2009

(65) Prior Publication Data
US 2010/0277030 A1   Nov. 4, 2010

(51) Int. Cl.
*H02K 1/18* (2006.01)
(52) U.S. Cl. ............. 310/216.049; 310/91; 310/216.113
(58) Field of Classification Search ............. 310/216.49, 310/216.113, 51, 91, 216.052
See application file for complete search history.

(56) References Cited

U.S. PATENT DOCUMENTS

| | | | |
|---|---|---|---|
| 1,882,487 A * | 10/1932 | Dupont | 310/65 |
| 3,447,010 A * | 5/1969 | Vreeland | 310/216.127 |
| 3,465,188 A * | 9/1969 | Sisk | 310/216.004 |
| 3,693,035 A * | 9/1972 | Ostwald | 310/51 |
| 4,399,382 A * | 8/1983 | Volkrodt | 310/216.055 |
| 4,625,160 A | 11/1986 | Hucker | |
| 4,912,350 A * | 3/1990 | Parshall et al. | 310/216.014 |
| 4,982,123 A | 1/1991 | Raad | |
| 5,023,537 A | 6/1991 | Baits | |
| 5,027,026 A * | 6/1991 | Mineta et al. | 310/216.127 |
| 5,196,746 A | 3/1993 | McCabria | |
| 5,327,069 A | 7/1994 | Radun et al. | |
| 5,349,257 A | 9/1994 | Hernden | |
| 5,755,023 A * | 5/1998 | Neuenschwander | 29/596 |
| 5,929,545 A * | 7/1999 | Fargo | 310/89 |
| 6,260,667 B1 | 7/2001 | Sugden | |
| 6,455,975 B1 | 9/2002 | Raad et al. | |
| 6,462,429 B1 | 10/2002 | Dhyanchand et al. | |
| 6,544,009 B2 * | 4/2003 | Makino et al. | 417/312 |
| 6,593,547 B1 | 7/2003 | Raad | |
| 6,608,418 B2 | 8/2003 | Andres et al. | |
| 6,707,205 B2 | 3/2004 | Johnsen | |
| 6,753,637 B2 | 6/2004 | Tornquist et al. | |
| 6,791,230 B2 | 9/2004 | Tornquist et al. | |
| 6,844,707 B1 | 1/2005 | Raad | |
| 6,850,043 B1 | 2/2005 | Maddali | |
| 6,879,083 B2 | 4/2005 | Doherty et al. | |
| 6,979,929 B2 | 12/2005 | Tornquist et al. | |
| 7,015,616 B2 | 3/2006 | Doherty et al. | |
| 7,015,617 B2 | 3/2006 | Tornquist et al. | |
| 7,064,526 B2 | 6/2006 | Patterson | |
| 7,078,826 B2 | 7/2006 | Xu et al. | |
| 7,086,137 B2 | 8/2006 | Tornquist et al. | |
| 7,208,854 B1 | 4/2007 | Saban et al. | |
| 7,224,147 B2 | 5/2007 | Shah et al. | |

(Continued)

FOREIGN PATENT DOCUMENTS

JP     55-13646    *  1/1980

(Continued)

*Primary Examiner* — Burton Mullins
(74) *Attorney, Agent, or Firm* — Carlson Gaskey & Olds PC

(57) ABSTRACT

A stator core for a generator includes a multiple of core laminations along an axis, each of the multiple of core laminations define at least one leg which extends in a radial direction from the axis.

5 Claims, 7 Drawing Sheets

U.S. PATENT DOCUMENTS

| | | |
|---|---|---|
| 7,242,167 B2 | 7/2007 | Patterson |
| 7,292,003 B1 | 11/2007 | Baker |
| 7,292,011 B2 | 11/2007 | Beneditz |
| 7,327,048 B2 | 2/2008 | Xu et al. |
| 7,342,331 B2 | 3/2008 | Down et al. |
| 7,365,521 B2 | 4/2008 | Patterson |
| 7,388,300 B2 | 6/2008 | Andhel et al. |
| 7,408,327 B2 | 8/2008 | Shah et al. |
| 7,439,646 B2 | 10/2008 | Birdi et al. |
| 7,475,549 B2 | 1/2009 | Alexander et al. |
| 7,476,994 B2 | 1/2009 | Birdi et al. |
| 2009/0072655 A1* | 3/2009 | Sano et al. .................... 310/217 |

FOREIGN PATENT DOCUMENTS

| | | | |
|---|---|---|---|
| JP | 57-42534 U | * | 3/1982 |
| JP | 2-107237 U | * | 8/1990 |
| JP | 06-245415 | * | 9/1994 |

* cited by examiner

LAMINATED STATOR ASSEMBLY

BACKGROUND

The present disclosure relates to a generator, and more particularly to a laminated stator mounting arrangement therefor.

Typical installation of a stator into a housing often relies on a press fit between a cylindrical bore in a housing and a cylindrically ground stator core outer diameter. In some installations, this may not be desirable as the press fit arrangement may prevent optimal positioning of the PMG stator in relation to other components.

SUMMARY

A stator core for a generator according to an exemplary aspect of the present disclosure includes a multiple of core laminations along an axis, each of the multiple of core laminations define at least one leg which extends in a radial direction from the axis.

A stator assembly for a generator according to an exemplary aspect of the present disclosure includes a stator core having a multiple of core laminations along an axis, each of the multiple of core laminations define at least one leg which extends in a radial direction from the axis. A multiple of windings engaged with a multiple of core slots defined by the multiple of core laminations and a fastener assembly attached to the at least one leg to axially clamp the multiple of core laminations together.

A generator according to an exemplary aspect of the present disclosure includes a stator core having a multiple of core laminations along an axis, each of the multiple of core laminations define at least one leg which extends in a radial direction from the axis, the at least one leg mounted to a housing.

A method of manufacturing a stator assembly according to an exemplary aspect of the present disclosure includes stacking a multiple of core laminations along an axis, each of the multiple of core laminations define at least one leg which extends in a radial direction from the axis.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
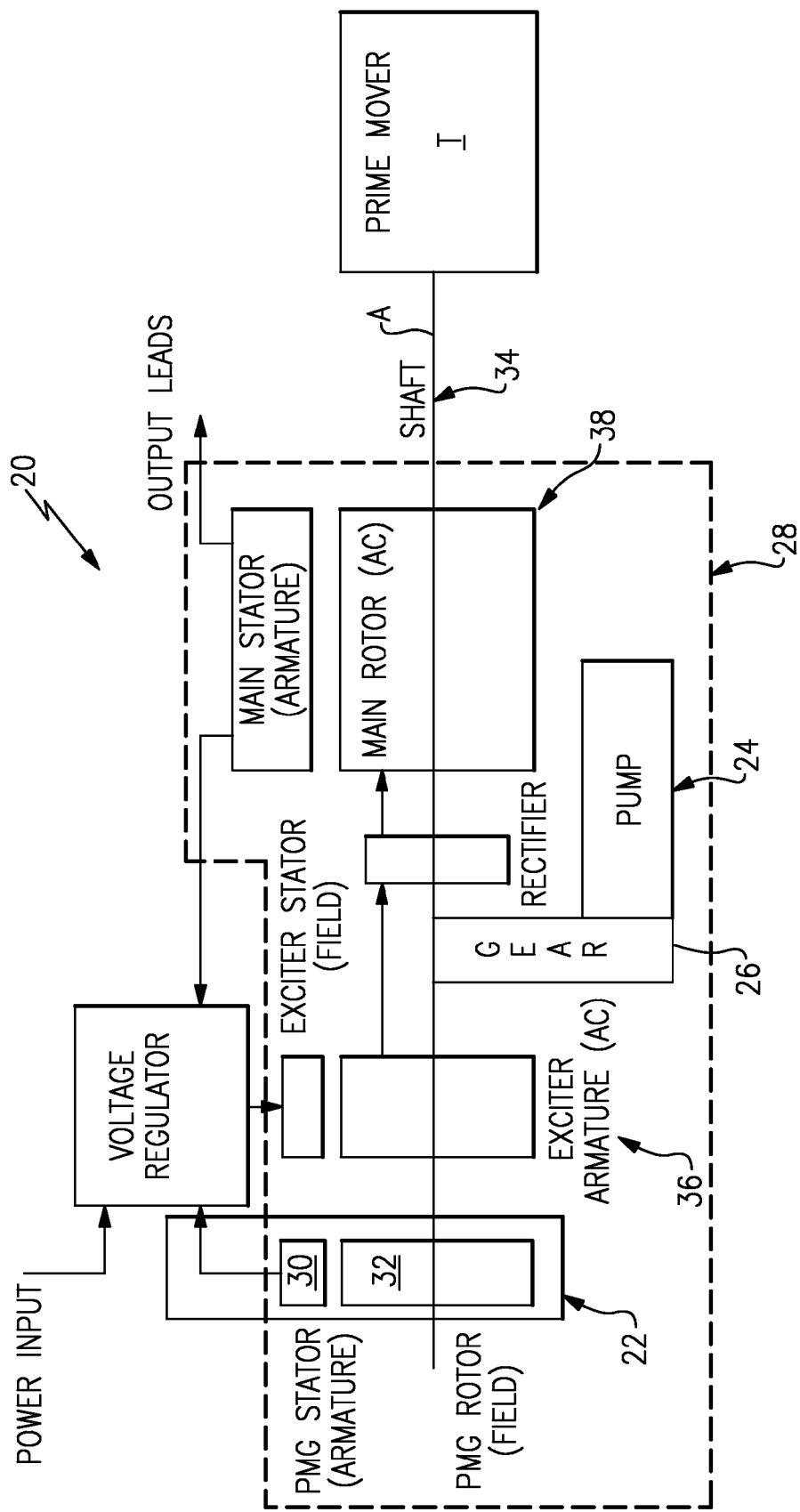
FIG. 1 is a schematic view of a generator.

FIG. 1 schematically illustrates selected portions of an example generator system 20 for starting a turbine engine T or generating electrical current when being driven by the turbine engine T. The generator system 20 may include a dynamoelectric portion 22, a hydraulic pump 24 and a gearbox 26 therebetween all contained within a common housing 28. The gearbox 26 may be a gear reduction gear train to drive the hydraulic pump 24 at a relatively slower speed than the dynamoelectric portion 22.

The dynamoelectric portion 22 may generally include a stator assembly 30 and a rotor assembly 32 such as for a high speed, variable frequency permanent magnet generator (PMG). The stator assembly 30 and the rotor assembly 32 define an axis of rotation A such that the rotor assembly 32 is rotatable about the axis of rotation A within the stator assembly 30 (also illustrated in FIG. 2). The rotor assembly 32 may be mounted on a rotor shaft 34 or other support structure. The dynamoelectric portion 22 may alternatively or additionally include other components such as an exciter system 36 and a main AC system 38.

Figure 3:
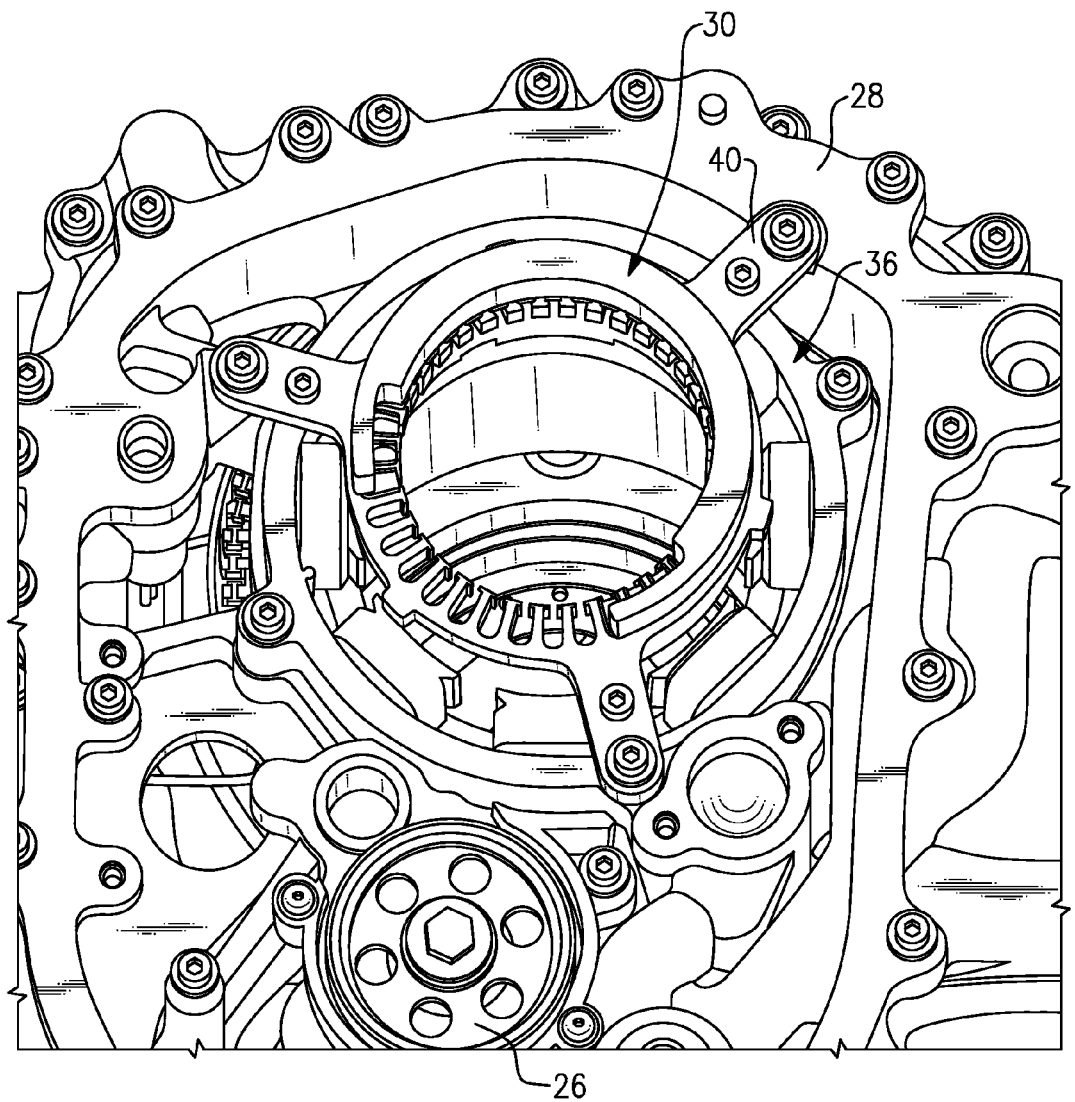
FIG. 3 is a perspective view of the PMG stator mounted within a housing.

Referring to FIG. 3, the stator assembly 30 is mounted within the housing 28 through a multiple of legs 40 to provide for a desired position within the housing 28 in relation to other components. The legs 40 essentially increase the effective diameter of the stator assembly 30 beyond the diameter of other components, such that the stator assembly 30, in one non-limiting embodiment, may engage the housing 28 to facilitate installation of the exciter system 36 therebelow. It should be understood that other component arrangements will benefit from the stator leg arrangement disclosed herein.

Figure 2:
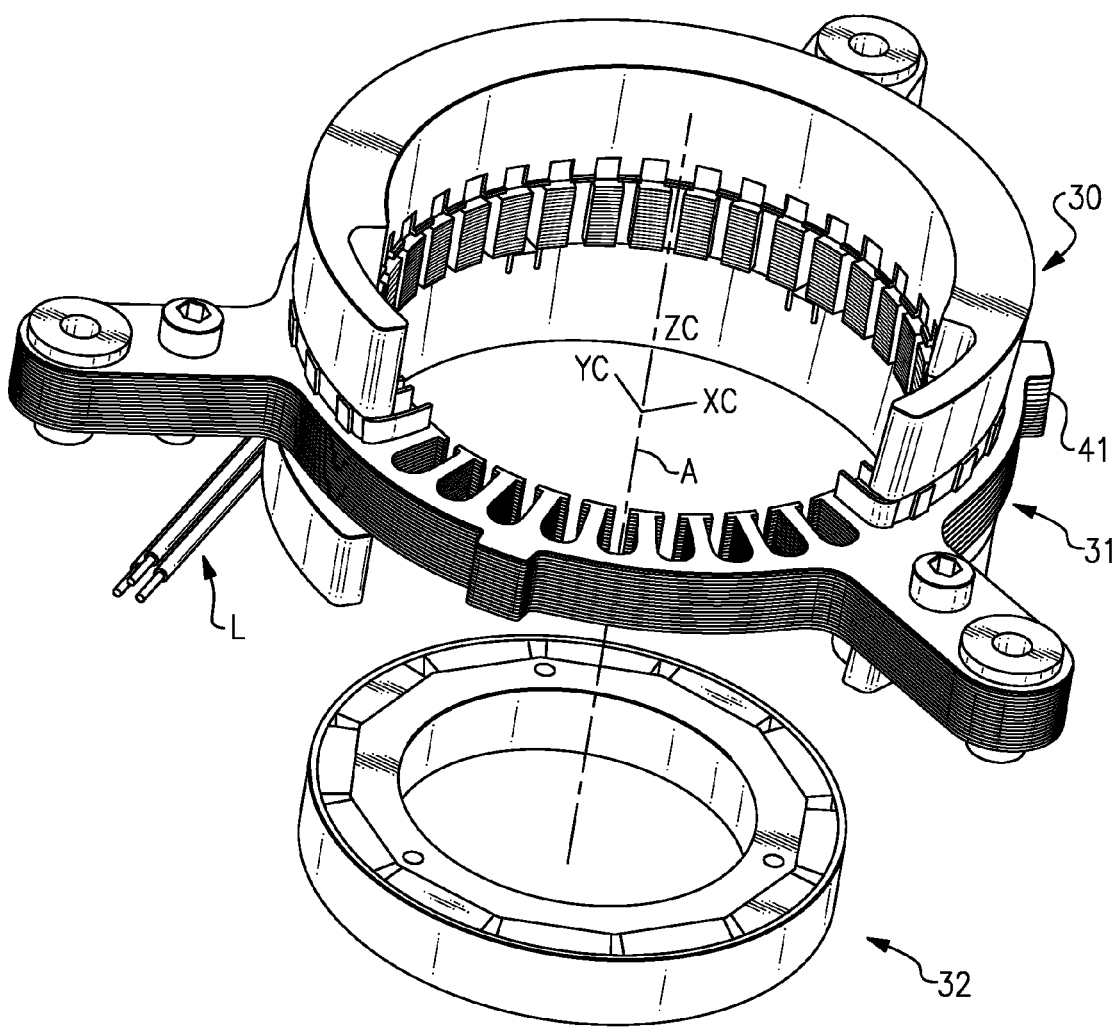
FIG. 2 is a general exploded view of a permanent magnet generator (PMG) for use with the present disclosure.
Figure 4:
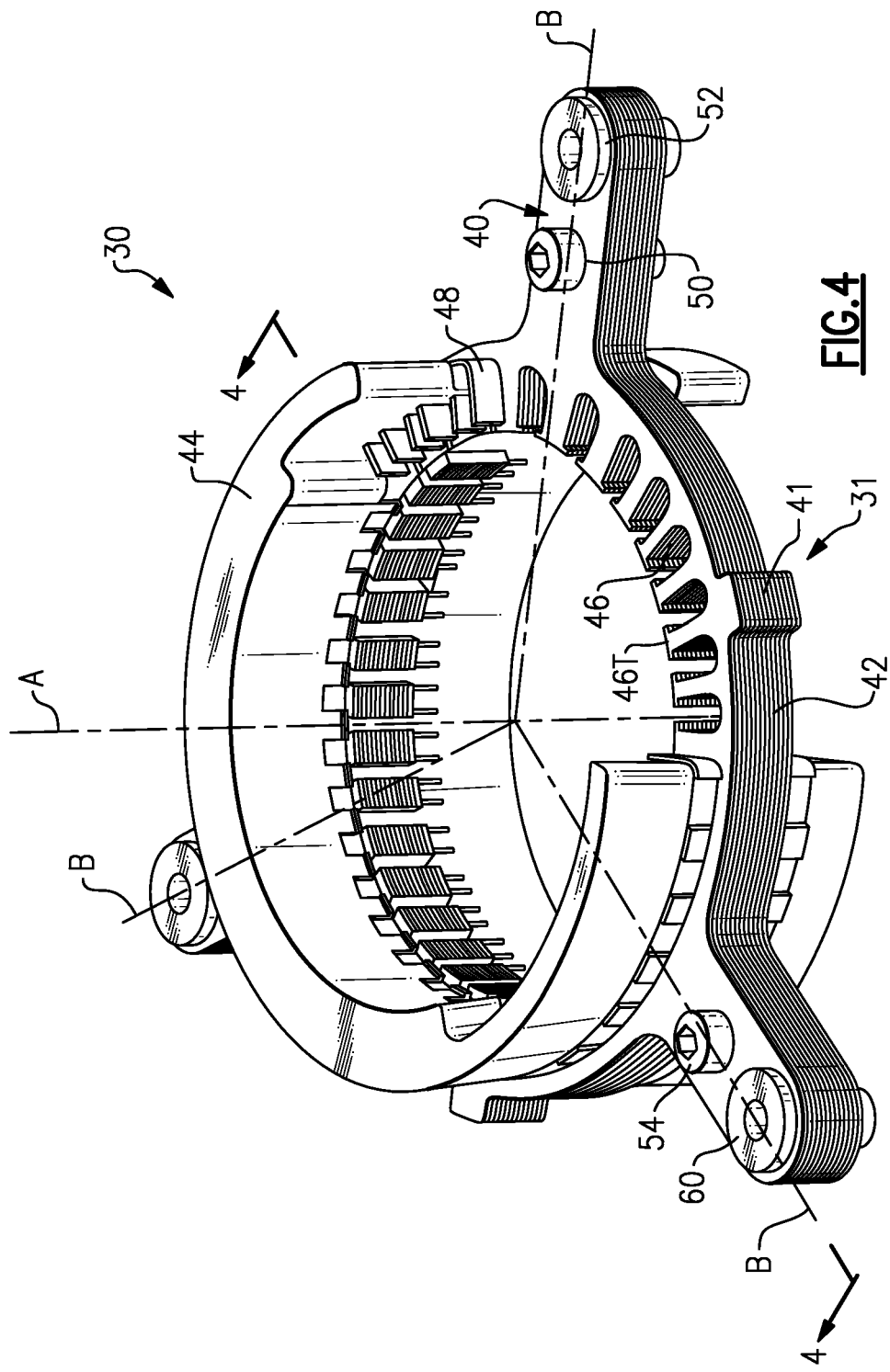
FIG. 4 is a perspective view of a PMG stator assembly.

Referring to FIG. 4, the stator assembly 30 generally includes a stator core 31 formed from a multiple of core laminations 42. The stator core 31 supports a multiple of windings 44 inserted into core slots 46 defined by the multiple of core laminations 42. The windings 44 are spaced from each of the core slots 46 by a respective insulator 48. The windings 44 may be constructed of layered and insulated copper wire, inserted into the core slots 46, connected together and impregnated with resin. Stator leads L may terminate in a standard connection lug or other connector for connection to the load (FIG. 2). The multiple of core laminations 42 may be constructed of stacked thin laminations of electrical steel which are stacked.

The legs 40 of the stator assembly 30 are integrally formed into each of the multiple of core laminations 42. The legs 40, in one non-limiting embodiment, may be stamped when the stator teeth 46T and core slots 46 are stamped within each of the core laminations 42. In one non-limiting embodiment, the multiple of core laminations 42 define three legs 40 which are radially spaced equally around the axis A.

Each of the multiple of core laminations 42 includes tab 41 which is stamped to raise material. The tabs 41 create an interlocked core" in which the raised material tab 41 facilities interlock with the mating core laminations 42 to hold the each of the core laminations 42 together.

A first aperture 50 and a second aperture 52 are also stamped or otherwise formed into each leg 40. The second aperture 52 is outboard the first aperture 50 along an axis B which extends in a radial direction from the axis A.

Figure 5:
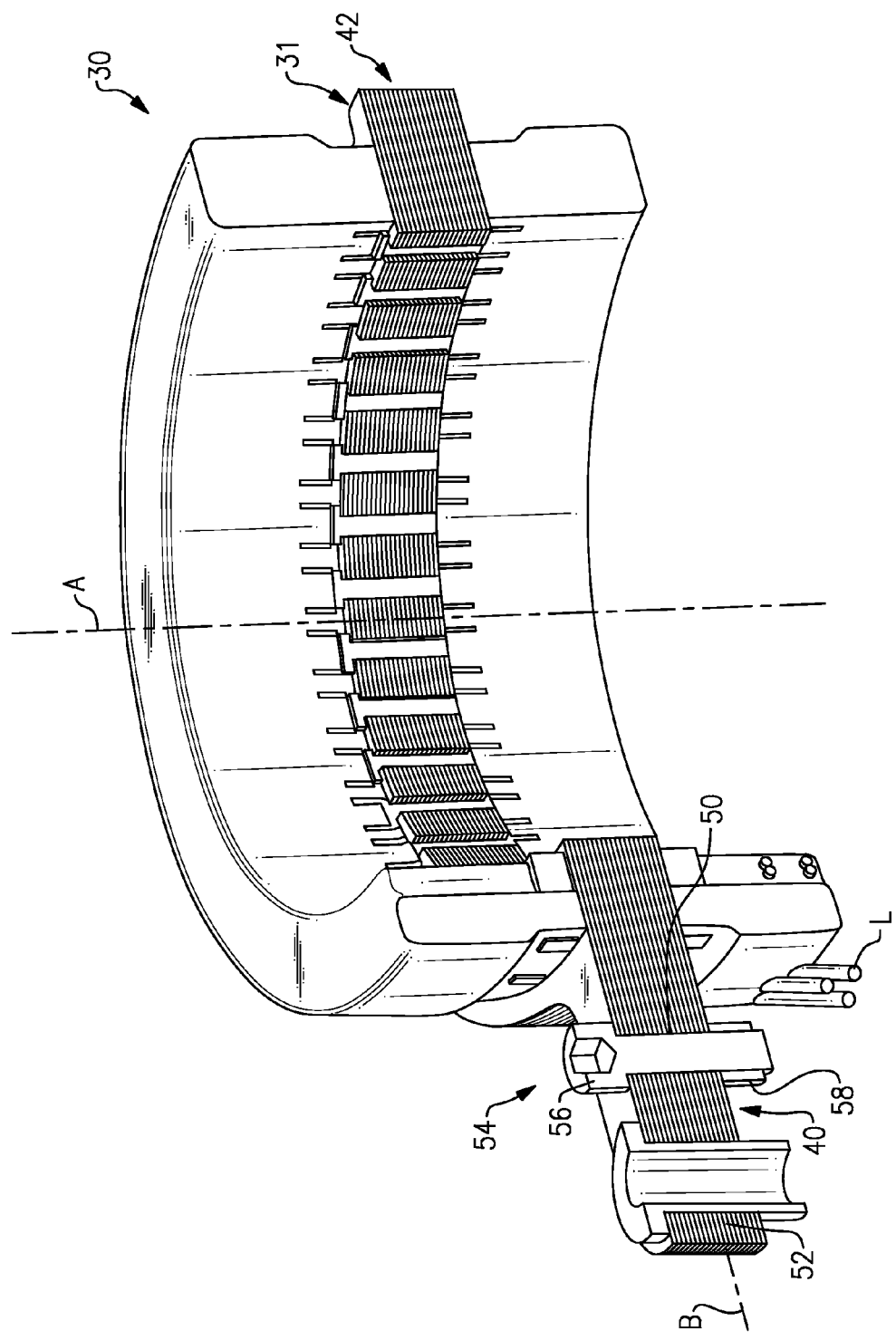
FIG. 5 is a sectional view of the PMG stator assembly taken along line 4-4 in FIG. 3.

The first aperture 50 is sized to receive a fastener assembly 54 such as a bolt 56 and nut 58 (FIG. 5). The first aperture 50, in one non-limiting embodiment, may be located at the approximate center approximately half way along the length of each leg 40. The first aperture 50 provides for a location in the stacked core laminations 42 within which to insert the fastener assembly 54 (FIG. 5). The fastener assembly 54 provides for a tight fit within the first aperture 50 to pilot the core laminations 42 concentrically about the bolt 56. The fastener assembly thereby axially clamps the multiple of core laminations 42 to facilitate a stiffer and more rigid mount structure for the stator assembly 30 and dynamoelectric portion 22.

Figure 6:
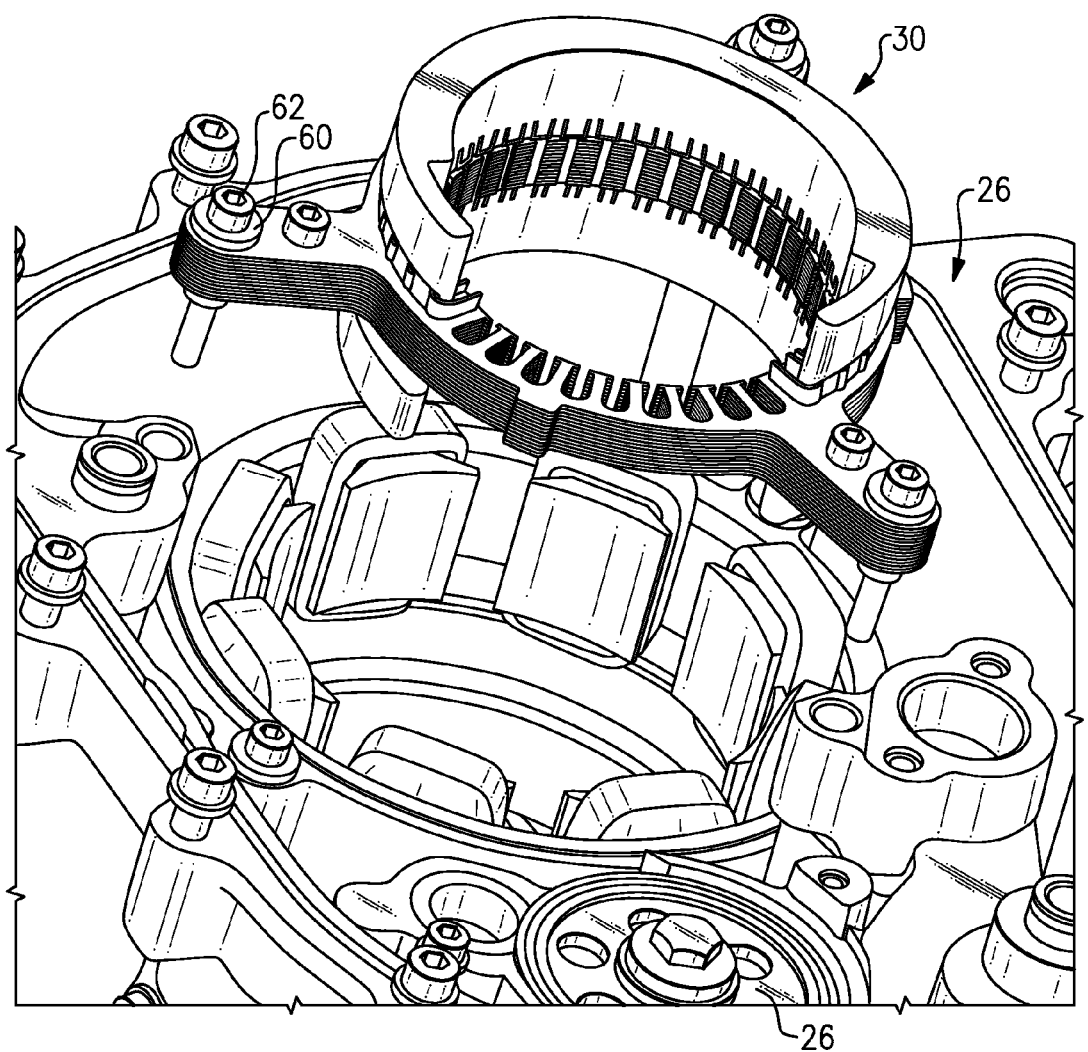
FIG. 6 is a general exploded view of the stator assembly relative to the generator.

The second aperture 52 is sized to receive a mounting bushing 60 (also illustrated in FIG. 5). The mounting bushing 60 receives a mount fastener 62 to affix the stator assembly 30 to the housing 28 (FIG. 6).

Figure 7A:
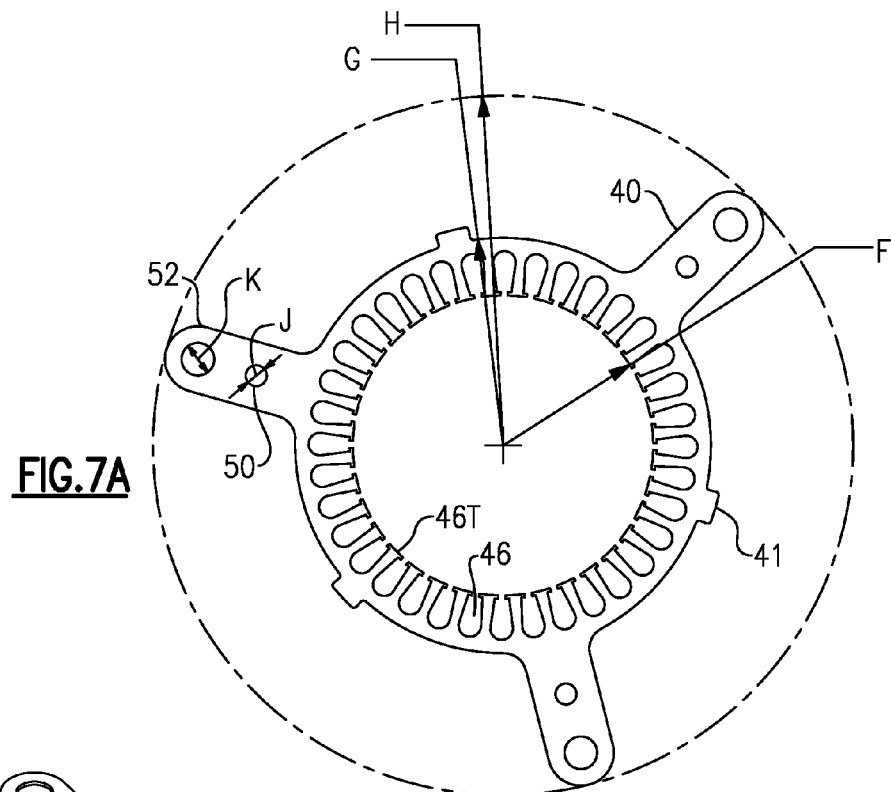
FIG. 7A is a top view of a single core lamination of the stator assembly.
Figure 7B:
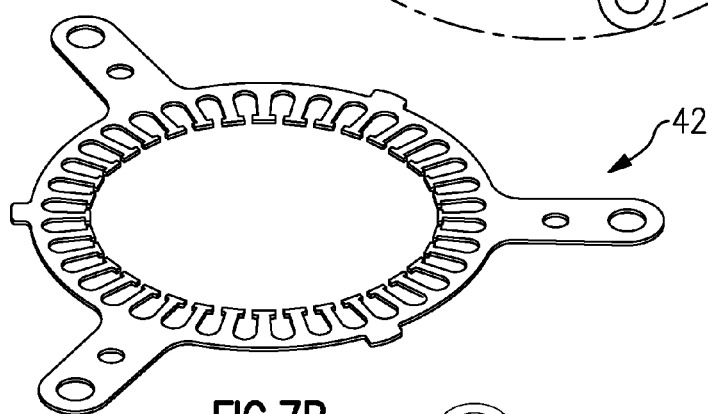
FIG. 7B is a perspective view of a single core lamination of the stator assembly.
Figure 7C:
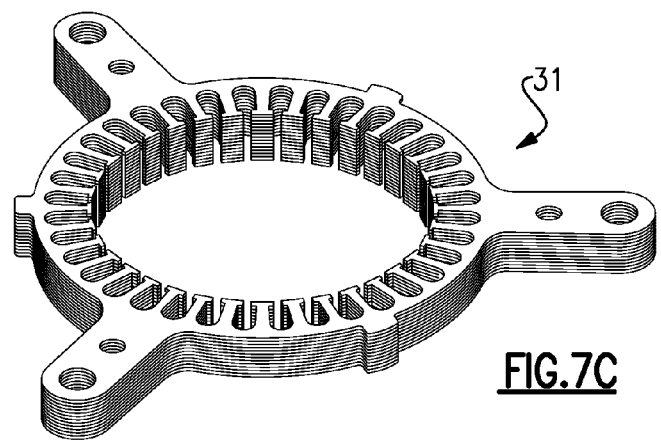
FIG. 7C is a perspective view of a stator core assembly.

Referring to FIG. 7A, one non-limiting dimensional embodiment of the disclosed stator assembly 30 is illustrated. The multiple of core laminations 42 (illustrated as a single core lamination in FIG. 7B) defines each stator core assembly 30 (FIG. 7C). Each of the multiple of core laminations 42 is identical such that the multiple of core laminations 42 are readily stacked.

Each of the multiple of core laminations 42 are defined by generally three dimensions, an inner core radius F, an outer core radius G, and an outer leg radius H. In one non-limiting embodiment, the inner core radius F is 1.4 inches (36.4 mm), the outer core radius G is 2.0 inches (49.7 mm), and the outer leg radius H is 3.3 inches (84.0 mm). The outer leg radius H defines the outermost diameter defined by the legs 40. In this non-limiting dimensional embodiment, the outer leg radius H defines a ratio with the inner core radius F of between approximately 3:1 to 2:1. The outer leg radius H defines a ratio with the outer core radius G between approximately 1.3:1 to 1.9:1. The inner core radius F is also approximately three-fourth the outer core radius G. These ratios facilitate a stiffer and more rigid mount structure.

The first aperture 50 is defined by a diameter J and the second aperture 52 is defined by a diameter K. In one non-limiting embodiment, diameter J is 0.2 inches (5.1 mm) and diameter K is 0.3 inches (8.4 mm).

In one non-limiting aircraft environment, the legs 40 of the stator core 31 essentially increase the effective diameter of the stator assembly 31 beyond the diameter of other components to engage the housing 28 and facilitate installation of the exciter system therebelow. Such an arrangements facilities a compact arrangement which saves cost, weight, and complexity.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A stator core for a generator comprising
a multiple of core laminations along an axis, each of said multiple of core laminations define at least one leg which extends in a radial direction from said axis, said at least one leg defines a first aperture and a second aperture; and
a mounting bushing located at least partially within said second aperture.

2. The stator core as recited in claim 1, wherein said second aperture is outboard of said first aperture.

3. A stator assembly for a generator comprising
a stator core having a multiple of core laminations along an axis, at least one of said multiple of core laminations define at least one leg which extends in a radial direction from said axis;
a multiple of windings engaged with a multiple of core slots defined by the multiple of core laminations;
a fastener assembly attached to said at least one leg through a first aperture to axially clamp said multiple of core laminations together; and
a mounting bushing located at least partially within a second aperture in said at least one leg.

4. The stator assembly as recited in claim 3, further comprising an insulator within each of said multiple of core slots to space said windings therefrom.

5. The stator assembly as recited in claim 3, wherein each of said multiple of core laminations define said at least one leg.

* * * * *